Figure 1:
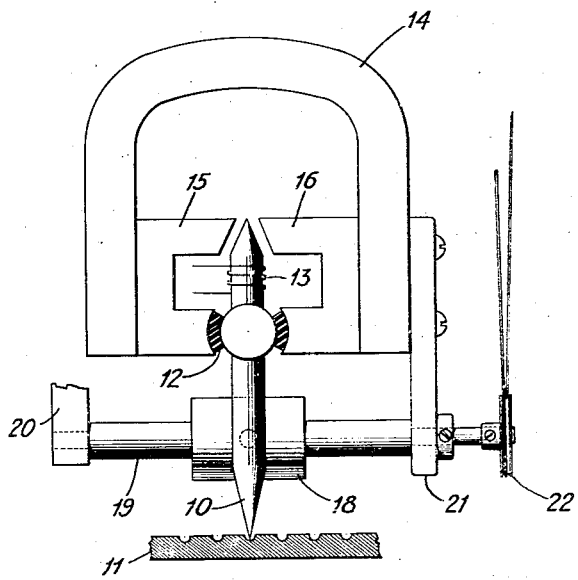

Feb. 20, 1934.   A. V. BEDFORD   1,947,544

SYSTEM FOR DAMPING THE MOTION OF MECHANICAL DEVICES

Filed May 14, 1932

INVENTOR
A. V. BEDFORD
BY
ATTORNEY

Patented Feb. 20, 1934

1,947,544

UNITED STATES PATENT OFFICE 1,947,544

SYSTEM FOR DAMPING THE MOTION OF MECHANICAL DEVICES

Alda V. Bedford, Collingswood, N. J., assignor to Radio Corporation of America, a corporation of Delaware Application May 14, 1932. Serial No. 611,335

13 Claims. (Cl. 274—1)

This invention relates to systems for damping the motion of mechanical devices such as the drive mechanism of sound recording or reproducing apparatus, and has for its principal object the provision of an improved apparatus and method of operation whereby a damping force proportional to the driving speed is produced.

It is essential for accurate recording or reproducing of sound with apparatus of the grooved disc type that the relative movement between the stylus and the record be maintained independent of speed irregularities which tend to result from variation in the driving speed and oscillation of the various parts at their natural vibration periods. Likewise, in the operation of film type recorders and reproducers it is essential for accurate results that the film speed be maintained independent of extraneous effects.

Various means have been provided in the past for stabilizing the speed of sound recording and reproducing apparatus and for obviating hunting. For the purpose of smoothing out speed irregularities it is customary to provide a heavy rotating part such as a gear or flywheel. The problem of obviating hunting has been met by the provision of surfaces arranged to rub against one another and thus produce a frictional force whereby the tendency to oscillation is reduced. These means, however, have not been altogether satisfactory from a practical viewpoint for the reason that they produce a damping force which is substantially constant irrespective of the relative speeds of the frictional surfaces. These damping means have usually operated with ordinary friction between solids and it is well known that friction of this character is essentially constant with change in the sliding speed. It is necessary in order to eliminate irregularities due to oscillation of the various parts at their natural vibration period that the damping force increase with and be proportional to the oscillation speed. In accordance with the present invention, such a damping force is produced by the provision of two frictional surfaces which are moved at different speeds and in different directions.

An auxiliary object of the invention is the provision of a sound recording or reproducing apparatus wherein the relation between the record and the recording or reproducing element at the point of translation is rendered independent of undesired speed irregularities which tend to result from hunting, variations in driving speed and the like.

A further object is the provision of a damping force which is dependent on the friction between two surfaces moved at different speeds and in different directions.

The invention will be better understood from the following description when considered in connection with the accompanying drawing, and its scope will be pointed out in the appended claims.

Figure 2:
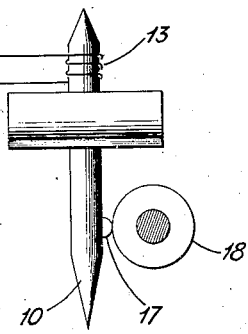
Figure 3:
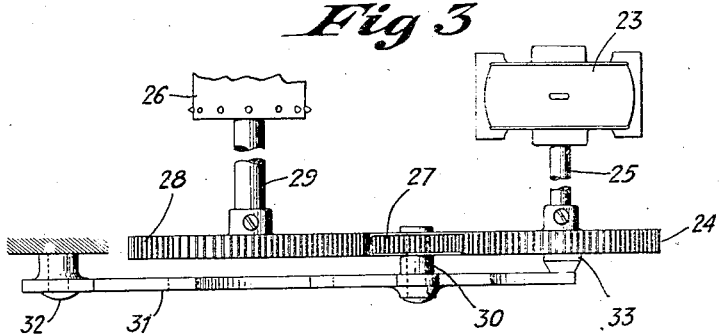
Figure 5:
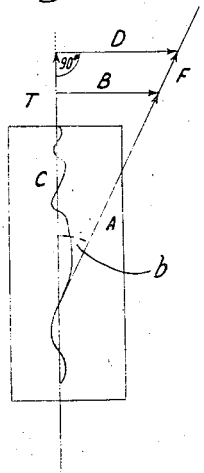
Figure 4:
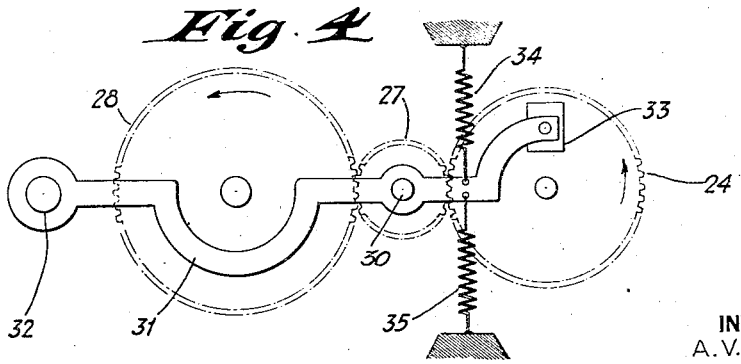

Referring to the drawing,

Figs. 1 and 2 illustrate the application of the invention to a sound recorder of the disc record type, Figs. 3 and 4 illustrate the application of the invention to a sound recorder or reproducer of the film type, and Fig. 5 is an explanatory diagram relating to the operation of the apparatus illustrated by Figs. 1 to 4.

The apparatus illustrated by Figs. 1 and 2 includes a stylus 10 arranged to cooperate with a record 11 and pivoted in a resilient bearing 12 which may be of rubber or the like. At its upper end the stylus 10 is provided with a voice current coil 13 and is arranged to cooperate with a magnet 14 which is provided with bifurcated pole pieces 15 and 16. Intermediate the pivot 12 and the stylus point is provided a shoe 17 arranged to contact with a drum 18. The roller 18 is mounted on a shaft 19 which is provided with bearings 20 and 21. Upon the end of the shaft 19 is provided a pulley 22 which is driven by a source of power not shown. It is desirable that the rotational speed of the drum 18 be high as compared to the sidewise movement of the stylus shoe 17.

It can be easily demonstrated that under these conditions the damping force applied to the stylus by the drum 18 increases with and is proportional to the speed at which the stylus moves. Referring to Fig. 5, let $b$ be the instantaneous angle of the path of the shoe with respect to the median line of the drum, and F be a vector representing the constant force required to slide the shoe on the drum in a direction along the path. Since the drum speed is assumed to be high compared to the lateral speed of the shoe the angle $b$ is always small. The vector F can be resolved into two right angle components, T and D, so that D represents the force opposing the lateral vibrational motion of the shoe. Similarly A, B, and C represent velocity vectors of the frictional shoe on the drum, B representing the lateral velocity of the shoe and C representing drum surface speed.

Now $$D = F \sin b \text{ and } B = C \tan b \text{ or } b = \tan^{-1}\frac{B}{C}$$

Hence $$D = F \sin (\tan^{-1}\frac{B}{C}).$$

But for small angle $\tan b \cong \sin b$ so that $D = FB/C$

But $$\frac{F}{C}$$

is constant so D is proportional to B. This means that the force opposing lateral motion of the friction shoe is proportional to and in opposition to its lateral velocity, which is in accordance with the law of true resistance damping i. e. the damping force is proportional to the driving speed.

The film drive mechanism of Figs. 3 and 4 includes a drive motor 23 which is connected to a gear 24 through a shaft 25. The film sprocket 26 is driven by the gear 24 through an idler gear 27 and a gear 28 mounted on the sprocket shaft 29. The gear 27 is mounted on a stub shaft 30 which is supported on an arm 31 pivoted at 32. At its free end it is provided with a friction shoe 33 arranged to rub against the side of the gear 24, and may be driven in the direction indicated by the arrow. For keeping the gear 27 in a central position with respect to the gears 24 and 28 a pair of springs 34 and 35 are provided.

Assuming that the gear 28 has considerable mass, irregularities in the driving speed of the gear 24 may cause the arm 31 to oscillate slightly about its pivot alternately stretching and shortening the springs 34 and 35. This action will absorb a part of the irregularities in the driving speed of the gear 24, and the gear 28 will therefore rotate more smoothly than the gear 24. The mass of the gear 28 and the resilience of the springs 34 and 35, however, form a vibratory system which tends to continue to oscillate after variations in the driving speed have ceased.

Since the normal rubbing friction of the bearings is incapable of damping out these oscillations, it is necessary to provide the friction shoe 33. It will be observed that the oscillating motion of this shoe is effectively along the radius of the gear 24, and that the movement of the gear is at substantially right angles to the movement of the shoe. The operation of this apparatus is therefore the same as that of Figs. 1 and 2 insofar as the damping action is concerned. They both have the advantage that the damping friction increases with and is proportional to the driving speed. For convenience in expression the apparatus is designated in the claims as a photographic apparatus irrespective of whether the apparatus is utilized as a sound recorder or as a sound reproducer.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of the invention.

Having thus described my invention, what I claim is:

1. A phonographic apparatus including a mechanical system which tends to oscillate at a predetermined frequency, including means having a pair of frictional surfaces arranged to be moved at different speeds in directions substantially at right angles to one another for damping said oscillations.

2. The combination of a vibratory stylus, means including an audio coil for driving said stylus, and frictional means arranged to be moved while in contact with said stylus for applying to it a damping force which is substantially proportional to its movement.

3. The combination of a vibratory stylus, driving means for said stylus, and means for applying to said stylus a damping force which increases with and is substantially proportional to the vibratory speed of said stylus.

4. The combination of a stylus, means for vibrating said stylus, and means including a rotatable element driven at a relatively high speed for applying a frictional damping force to said stylus.

5. An apparatus including a mechanical system which tends to oscillate at a predetermined free vibration period, including means having a pair of frictional surfaces arranged to be moved in different directions at different speeds for producing a damping force which increases with the driving speed of said apparatus.

6. The combination of means for supporting and moving a record of the film type, driving means subject to speed variation, inertia means coupled to said supporting and driving means, resilient means interposed between said driving means and said inertia means for absorbing said variations, and a pair of frictional surfaces movable respectively at speeds dependent on the speed of said driving means and of said resilient means for producing a damping torque which increases with the speed of said driving means.

7. The combination of a film sprocket, a massive gear coupled to said sprocket, driving means subject to speed variations, a gear arranged to be rotated by said driving means, a gear interposed between said massive and driven gears and mounted on a pivotal support for absorbing said variations, resilient means for returning said intermediate gear to a predetermined position between said massive and driven gears, and means responsive to movement of said intermediate gear for applying to said driven gear a damping torque which increases with the speed of said driving means.

8. A mechanical system including driving and driven gears arranged to rotate about fixed axes, an intermediate gear mounted on a pivotal axis and arranged to transmit motion between said driving and driven gears, resilient means for biasing said intermediate gear to a predetermined position, and frictional means movable in different directions at speeds respectively dependent on the speed of said driving gear and the oscillating speed of said intermediate gear for damping the oscillations which tend to be produced in said system.

9. An apparatus including a mechanical system which tends to oscillate at a predetermined free vibration period, and including means having a pair of frictional surfaces arranged to be moved in different directions at different speeds for producing a damping force responsive to the driving speed of said apparatus.

10. A phonographic apparatus including a mechanical system which tends to oscillate at a predetermined free vibration period, and including means having a pair of frictional surfaces movable in different directions at different speeds for producing a damping force responsive to change in the driving speed of said apparatus.

11. Apparatus including a mechanical system tending to oscillate at a predetermined free vibration period and including a member having a frictional surface arranged to be moved in one direction by said vibration, and another member having a frictional surface in contact with said first surface, and arranged to be moved in a different direction for producing a damping force on said first member.

12. Means for damping vibrations in a vibratory system comprising a vibratable member having a frictional surface thereon parallel with the plane of vibration, and a continuously driven rotary member having a frictional surface thereon in co-operative relation with said first surface and having its direction of movement perpendicular to that of the first member.

13. Means for damping vibrations in a vibratory system comprising a vibratable member having a frictional surface thereon parallel with the plane of vibration, and a continuously driven rotary member having a frictional surface thereon in co-operative relation with said first surface and having its direction of movement perpendicular to that of the first member, the said rotary surface being driven at a speed which is high compared to the speed of vibration of the first member.

ALDA V. BEDFORD.